(12) United States Patent
Irion et al.

(10) Patent No.: US 11,113,967 B2
(45) Date of Patent: Sep. 7, 2021

(54) METHOD FOR DETERMINING PARKING SPACES AND FREE-PARKING SPACE ASSISTANCE SYSTEM

(71) Applicant: Robert Bosch GmbH, Stuttgart (DE)

(72) Inventors: Albrecht Irion, Stuttgart (DE); Manuel Maier, Esslingen (DE)

(73) Assignee: Robert Bosch GmbH, Stuttgart (DE)

( * ) Notice: Subject to any disclaimer, the term of this patent is extended or adjusted under 35 U.S.C. 154(b) by 597 days.

(21) Appl. No.: 15/320,387

(22) PCT Filed: Jun. 8, 2015

(86) PCT No.: PCT/EP2015/062636
§ 371 (c)(1),
(2) Date: Dec. 20, 2016

(87) PCT Pub. No.: WO2016/000908
PCT Pub. Date: Jan. 7, 2016

(65) Prior Publication Data
US 2017/0154530 A1 Jun. 1, 2017

(30) Foreign Application Priority Data
Jul. 2, 2014 (DE) .......................... 102014212843.9

(51) Int. Cl.
*G08G 1/14* (2006.01)
*G08G 1/0962* (2006.01)
*G01C 21/36* (2006.01)

(52) U.S. Cl.
CPC ......... *G08G 1/144* (2013.01); *G01C 21/3685* (2013.01); *G08G 1/09623* (2013.01); *G08G 1/143* (2013.01); *G08G 1/147* (2013.01)

(58) Field of Classification Search
CPC ........ G02B 27/01; G08G 1/143; G08G 1/144; G08G 1/146
See application file for complete search history.

(56) References Cited

U.S. PATENT DOCUMENTS 9,581,997 B1* 2/2017 Penilla .................... B60L 53/80
2010/0253542 A1 10/2010 Seder et al.
(Continued)

FOREIGN PATENT DOCUMENTS

CN 103065494 A 4/2013
CN 103632572 A 3/2014
(Continued)

OTHER PUBLICATIONS

International Search Report dated Aug. 26, 2015, of the corresponding International Application PCT/EP2015/062636 dated Jun. 8, 2015.

*Primary Examiner* — Benyam Haile
(74) *Attorney, Agent, or Firm* — Norton Rose Fulbright US LLP; Elizabeth Tretter

(57) ABSTRACT

A method for determining parking spaces, traffic participants ascertaining information about free parking spaces and communicating the information to a cloud computing system, the cloud computing system storing information about the free parking spaces in retrievable fashion in a parking space map, information about the provided parking space being visually presented on a display device of the traffic participant. A computer program and a free parking space assistance system, which are suitable in particular for carrying out the method, are also provided.

9 Claims, 3 Drawing Sheets

(56) References Cited

U.S. PATENT DOCUMENTS

| | | | | |
|---|---|---|---|---|
| 2014/0176348 A1* | 6/2014 | Acker, Jr. | ............... | G08G 1/146 |
| | | | | 340/932.2 |
| 2015/0371541 A1* | 12/2015 | Korman | ................. | G08G 1/144 |
| | | | | 340/932.2 |

FOREIGN PATENT DOCUMENTS

| | | | |
|---|---|---|---|
| DE | 102009021014 A1 | 11/2009 |
| DE | 102009028024 A1 | 2/2011 |
| DE | 102012216994 A1 | 3/2014 |
| EP | 2724911 A1 | 4/2014 |

* cited by examiner

METHOD FOR DETERMINING PARKING SPACES AND FREE-PARKING SPACE ASSISTANCE SYSTEM

FIELD

The present invention relates to a method for determining parking spaces. The present invention also includes a computer program and a free parking space assistance system, suitable in particular for carrying out the method.

BACKGROUND INFORMATION

In German Patent Application No. DE 10 2009 028 024 A1, a parking guidance system for navigating a vehicle looking for a parking space to a free parking space is described, information being researched through vehicles in traffic concerning available free parking spaces, and the information being communicated to the vehicle looking for the parking space. Here, in particular the problem of parking along the curb and in parking spaces is addressed. For recognizing parking spaces, the vehicles have optical and non-optical sensors and navigation units. The ascertaining of free parking spaces takes place either in that a vehicle communicates its position and vehicle data when a parking space used up to them is no longer required, or by measuring open spaces using video signals and arithmetic calculation of the size. The information concerning free parking spaces is communicated to a central server and is stored thereon.

A particular advantage of the conventional cloud computing system compared to the realization as a server is scalability. The computing instances can be arbitrarily expanded or reduced by further instances as needed. A further advantage of the cloud computing system is its cost advantage relative to conventional systems. Local resources, in particular software and hardware, can be saved, and for example cost advantages can be achieved when there is payment according to duration or use of resources.

German Patent Application No. DE 10 2012 216 994 A1 describes a cloud-based system for determining parking spaces, in which individual vehicles use GPS to obtain the position of parking spaces, and use environmental sensors to obtain information about the length and width of the parking spaces, and recognize free parking spaces on the basis of this and communicate the information to a server. On the server, the information is stored together with metadata, for example concerning traffic and conditions, such as for example whether a resident parking space, short-time parking space, handicapped parking space, family parking space, etc., is present.

SUMMARY

In a method according to an example embodiment of the present invention for determining parking spaces, it is provided that traffic participants ascertain information concerning free parking spaces and communicate the information to a cloud computing system, and the cloud computing system stores the information concerning the free parking spaces in retrievable fashion in a parking space map. According to the present invention, it is provided that parking spaces are recognized and communicated to the cloud computing system independently of markings that are present or not present. The cloud computing system is set up to communicate information concerning the provided parking space to the traffic participants, so that this information is visually presented on a display device of the traffic participant. The traffic participant, for example the driver of a vehicle, can in this way recognize the information concerning the provided parking space, such as the precise position of the parking space, even if markings such as lines on the ground or the like are not present. According to the present invention, the available parking space is thus stored in the cloud computing system independently of parking space boundaries that have been detected, and can therefore be enabled flexibly, for example as a function of the size of the requesting vehicle or of particular circumstances.

Such a method for determining parking spaces, based on cloud computing, has the advantage that, using a multiplicity of sensor nodes, a large quantity of data can be acquired in the cloud computing system, also referred to for short as a cloud in the context of the present invention. A central element here is the networking of sensor information from a large number of vehicles. The large quantity of data is evaluated using intelligent data mining methods, and is provided to businesses and/or end users in a prepared form. Through the combination in the cloud, the current parking space situation can ideally be precisely ascertained. An advantage is that, using the cloud, a global map of the current parking space situation can be formed. For this purpose, according to the present invention it is not necessary to map defined individual parking spaces, for example indicated by markings, in the system. Instead, it is provided that free surfaces are classified, depending on the situation, as parking spaces by the cloud computing system, and a free parking space is assigned to a requesting traffic participant for example as a function of that participant's space requirement. Such a parking space, not bound to markings or boundaries in the real world, is also referred to as a "virtual parking space" in the current context. So that the traffic participant can reliably approach the provided "virtual" parking space even when markings are not present, according to the present invention the cloud computing system communicates corresponding information characterizing the provided parking space, which information is visually represented on a display device of the traffic participant.

The display device, also referred to as HMI (Human-Machine Interface), can for example be the navigation device, a smartphone application, a head-up display, or a head-down display, the information being displayed concerning free and/or occupied parking spaces in the vicinity of a particular location, for example the local environment of the vehicle, and/or in the vicinity of a known navigation destination. Ideally, the information is presented to the user in such a way that the up-to-dateness or reliability of the provided information is visible, for example how many minutes ago the parking space was recognized as free by another vehicle, and/or how many vehicles have confirmed the information. Here, information from different vehicles about a parking space is combined, for example camera recognition from one vehicle and status as free or occupied from a different vehicle.

The display device is preferably a head-up display (HUD). This has the advantage that the driver can visually acquire the information concerning the parking space without having to look away from the street. In particular, the head-up display is suitable for blending virtual objects into the field of view of the traffic participant. Thus, in a further preferred embodiment of the present invention, boundary lines and/or parking space symbols can be blended in that, according to the principle of "augmented reality," supplement the perception of the driver, in particular in such a way that a realistic impression of parking space boundaries results.

It is particularly advantageous if the traffic participants are vehicles, equipped with environmental acquisition devices and communication devices, that ascertain free parking spaces when traveling past them. Such systems, such as ultrasound systems, which are able to recognize whether parking spaces are occupied or free, and possibly also to measure these spaces, when traveling past them already exist in many modern vehicles, and can easily be expanded by additional software. In particular, here semiautonomous or autonomous parking assistance systems are to be mentioned, which navigate the driver into a parking space by intervening in the longitudinal and/or transverse regulation of the vehicle, and for this purpose have to measure the parking space precisely. The vehicle acts as a mobile sensor system in order to create a local map of free and occupied parking spaces during travel, without the driver influencing this or having to actively participate. The local information concerning free parking spaces is communicated to the cloud and made available. Given a corresponding number of vehicles equipped with corresponding environmental acquisition devices and communication units for communicating the information, in this way a comprehensive map of the free parking spaces results without any additional stationary sensor equipment. Further sensor equipment and/or information can nonetheless be included, in order for example to achieve better quality or greater coverage. It can for example be provided to use stationary sensors to obtain additional information about more remote regions not measured by vehicles traveling past. The acquisition takes place in particular independent of whether parking space markings are really present or not.

According to a preferred specific embodiment of the present invention, the location of the free parking space is ascertained by the traffic participant, or by a device assigned to the traffic participant, and is communicated to the cloud computing system. Particularly preferably, the location is ascertained using a navigation system. Navigation systems that can ascertain the current vehicle position in a map using GPS are already standard equipment in many vehicles, or can be present for example in a mobile device that can be connected to the vehicle and is suitable for this purpose. These systems can easily be expanded by additional software. The GPS system for example constantly acquires the position of the vehicle, and in this way can link the information of the parking assistant concerning free parking spaces with a local map. In other words, information concerning the potential and publicly available parking space is stored on a server in the cloud, for example in the form of position data (GPS, etc.), width and length, and orientation (transverse and longitudinal parking), and can be retrieved by the traffic participant, the information being constantly updated through reports of the participating vehicles.

According to a specific embodiment, moreover, a size of the free parking space is ascertained and is communicated to the cloud computing system. According to the present invention, the ascertaining of the size takes place independent of whether markings of the parking space are present or not. The ascertaining of the size of the parking space preferably takes place using an ultrasound system, which is for example part of a parking assistant. When the vehicle is traveling past, the lateral distance to obstacles is measured, and via the vehicle's own movement it is recognized whether an open parking space is present, and what dimensions it has.

According to a specific embodiment, in general meta-information is ascertained about free and occupied parking spaces, and is communicated to the cloud computing system. Such meta-information can be obtained in particular by cameras. The meta-information about the parking spaces can for example be obtained by recognizing signs, for example temporary "no stopping" signs or signs identifying resident, handicapped, family, women's, or private parking spaces, using a camera system and an image processing system, and the corresponding information can be linked with the information about the parking space.

According to a preferred specific embodiment of the present invention, free parking spaces and metadata about them are communicated to the traffic participant when there is a query, i.e., a request at the cloud computing system. Here, a pre-filtering of the parking spaces with regard to various items of meta-information is possible. The query at the cloud computing system can be produced via a connection to the cloud, e.g., using an integrated SIM card or a mobile device registered in the vehicle for example via Bluetooth or USB, in particular a smartphone. The requesting devices do not necessarily have to be installed in a vehicle equipped with a measuring device, but rather can be usable in any vehicles. The requesting devices moreover do not necessarily have to be assigned to vehicles. Request possibilities can also be provided through a Web service. In addition to this, it can be provided to also communicate information about occupied parking spaces and metadata about them.

While previous systems have been limited to vehicle-specific information and a few properties of the parking space, for example its size, in the solution using the cloud computing system a large amount of meta-information about the parking space and statistics is usable. Metadata and statistics about the parking spaces communicated by the cloud computing system to the traffic participant when there is a request include for example whether the parking spaces are paid or free of charge, and information that is updated daily or is time-dependent. Some meta-information, such as information about parking fees, or distribution of resident, handicapped, family, or women's parking spaces, can in some specific embodiments of the present invention also be provided by cities and municipalities, or can be extracted from the Internet using data mining methods. By connecting traffic guidance central units to the cloud computing system, (virtual) parking spaces can be made available as a function of the current traffic or other boundary conditions. That is, the search for parking spaces can advantageously be controlled in a targeted manner, for example at peak traffic times or in the case of (large) events.

Such retrievable metadata about the parking space can for example include: size of a parking fee, whether and when a resident parking space is present, whether and when a short-time parking space is present, whether a handicapped parking space is present, or whether a family or women's parking space is present. Further retrievable metadata about the parking space can for example include information about the part of the city, in particular whether events are currently taking place nearby and whether there is a connection to a public transportation system, for example a commuter train connection.

Retrievable statistics about the parking space can include: daily, weekday, and/or seasonal use of the parking space, and the number of break-ins in the surrounding area. It can for example be provided that information is outputted saying that parking spaces in a particular part of the city are generally occupied in the morning and are not free until the evening.

Also possible is a calculation of the reliability of the indication "parking space free" or "parking space occupied," for improved quality of the information. The indication therefore takes place not only with a timestamp indicating when the corresponding parking space was free, but also on the basis of the number of reports and the reliability of the reporting vehicles.

In further stages of expansion, drivers can select free parking spaces in their vicinity, and the vehicles can approach these parking spaces autonomously or semi-autonomously. Advantageously, more complex navigation recommendations can be derived from the meta-information and statistics, e.g. preferences for regions having in general many parking spaces, or many free parking spaces. The driver can thus for example navigate to the city center and park there, where he can specify preferences, for example avoiding parking garages. In addition, drivers can deliberately drive towards parts of streets, downtown areas, or parts of the city where the chance of a free parking space is particularly high at the current time. For this purpose, for example use can be made of usage statistics that are a function of time of day, calculated on the basis of the collected data in the cloud.

It is particularly advantageous that the cloud computing system can ascertain and provide free spaces in a local environment of the traffic participant or of a particular location, for example a known navigation destination. For this purpose, the location of the vehicle can for example be ascertained using GPS, and can be transmitted along with the request or requested by the cloud computing system in a dialogue. The particular location can be indicated to the cloud computing system by an input by the user, such as a text or voice input. The navigation destination can for example also be communicated through direct interaction with the navigation instrument. The size of the local environment can be specified for example by the traffic participant who made the request. For example, the value for the size of the local environment can at first be preset in the HMI, and can be capable of being made larger or smaller. Advantageously, in this way local segments of the global map of traffic participants can be made accessible in location-dependent fashion via an application for smartphone, or via a navigation device.

According to a further specific embodiment of the present invention, the cloud computing system offers free parking spaces that are suitable with regard to the vehicle dimensions, the desires of the traffic participant, and/or comparable meta-information; that is, for example only those free parking spaces are shown that are compatible with the dimensions of the vehicle of the traffic participant. This is particularly advantageous because today's parking assistance systems can precisely measure the parking spaces.

In addition, there is the possibility of integrating existing parking garage systems having free parking spaces via the cloud. Advantageously, as much information about free parking spaces in the environment surrounding the vehicle as possible is provided, and this information is combined from various sources. The information about the occupancy of a parking garage can be provided on the Internet by the operator of the parking garage, or for example can also take place via a traffic participant who has a camera system and who drives past a sign indicating information about the occupancy of a parking garage, and communicates the information on the sign.

In addition, according to the present invention computer programs are proposed in accordance with which the methods described herein are carried out when the computer programs are executed on programmable computer devices. A computer program can be for example a module for implementing a driver assistance system or subsystem thereof in a vehicle, or an application for driver assistance functions that can be executed on a mobile device. The mobile device can for example include a smartphone, a tablet, a notebook, and/or a navigation device in the automobile that has a computer, a display, an input device (HMI), and GPS. The computer program can be stored on a machine-readable storage medium, such as a permanent or rewritable storage medium, or can be assigned to a computer device, or can be on a removable CD-ROM, DVD, or on a USB stick. In addition or alternatively, the computer program can be provided on a computer device such as on a server or a cloud computing system for downloading, e.g., via a data network such as the Internet or a communication connection such as a telephone line or a wireless connection.

According to a further aspect of the present invention, a free parking space assistance system includes a cloud computing system that is set up to receive information about free parking spaces and to store it in a parking space map, and that is set up to provide the information about the free parking spaces upon request, i.e., when a query is made.

Individual vehicles supply only very limited local information. As soon as a sufficiently large number of vehicles is equipped with the corresponding software modules, the limited local information is fused inside the cloud, due to its multiplicity, to form a global, comprehensive, and up-to-date map about the parking space situation in the overall area of coverage of the free parking space assistance system.

A strength of the free parking space assistance system is that the information about free parking spaces in the cloud is most reliable and most up-to-date for the regions to which users are most often directed, in particular in city centers, shopping areas, or other densely populated areas. In these areas are located the most vehicles having the free parking space assistance system, and these vehicles ensure that the information in the cloud is constantly updated.

According to a preferred specific embodiment, the free parking space assistance system includes at least one vehicle having an environmental acquisition device and a communication unit, the environmental acquisition device being set up to ascertain free parking spaces and, ideally, additional meta-information about free and occupied parking spaces in the vicinity of the vehicle, and the communication unit being set up to transmit ascertained information to the cloud computing system.

The environmental acquisition device is preferably already in series production use as part of a parking assistance system. In this way, the parking assistance system becomes a mobile sensor system that can ascertain information about the current parking space situation directly surrounding the vehicle along the travel route chosen by the driver.

Preferably, the free parking space assistance system includes a further unit, for example a mobile device or navigation module, that is set up, i.e., on which for example a suitable application is installed, to call information about the free parking spaces from the cloud computing system, preferably to pre-filter the information according to suitable criteria, and to provide the information to a traffic participant. The unit can for example control a display on a mobile device or in the vehicle, or can issue a speech message, or can also carry on a conversation with the traffic participant.

Using the mobile devices or the navigation modules, further information can be obtained and communicated to the cloud computing system, for example that a free parking space has just been occupied, or statistics about usage behavior. Because such a system is successful only when widely distributed, the use of these additional, widely available devices for the start of such a service is very advantageous.

The use of the method according to the present invention is added value for the user, and can therefore for example be offered for a fee, e.g., via integration in a navigation device, or can be used as an advertising vehicle. For the use of the method according to the present invention, it is not necessary for the vehicle of the traffic participant to have a parking assistance system or the like. Business models are possible in which users who do not have an environmental acquisition device, and which therefore do not make a contribution to the global map in the cloud, pay a higher usage fee than users who, via their parking assistance, contribute to the creation of the map in the cloud. A tiered cost structure can also be realized.

It is also possible to offer, for a fee, a reservation system that manages the parking spaces centrally in the cloud, realized through a corresponding equipping of the parking spaces.

It is also possible to make the statistics collected by the cloud system available for further use, for example in city traffic planning.

BRIEF DESCRIPTION OF THE DRAWINGS

Exemplary embodiments of the present invention are shown in the figures, and are explained in more detail below.

DETAILED DESCRIPTION OF EXAMPLE EMBODIMENTS

Figure 1:
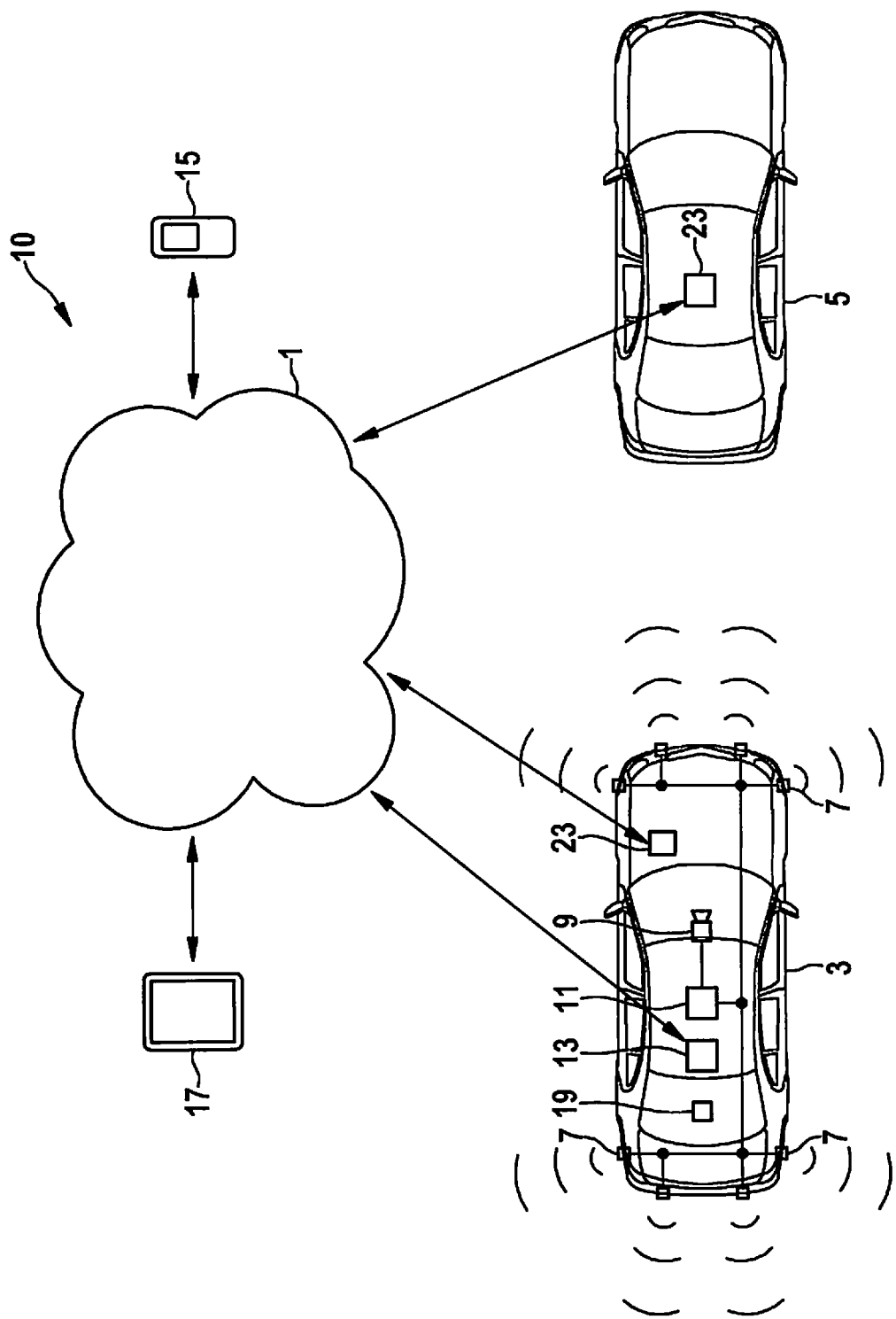
FIG. 1 shows a schematic representation of a free parking space assistance system.

FIG. 1 shows a schematic representation of a free parking space assistance system 10 having a cloud computing system 1, a first vehicle 3, a second vehicle 5, a mobile device 15, and a tablet PC 17. Free parking space assistance system 10 is suitable for carrying out the methods described above.

In the context of the present invention, cloud computing system 1 includes at least one computing cloud that offers useful access to virtualized computer hardware resources such as computers, networks, and memory. In addition, cloud computing system 1 can also include software-on-demand structures, namely computing clouds that offer useful access to collections of software and application programs. Cloud computing system 1 is set up to receive information about free parking spaces and to store it in a parking space map, and is set up to provide the information about the free parking spaces upon request, i.e. when there is a query. The system collects all local information from the individual networked vehicles and enters it into a global map via a suitable fusion strategy, using the position information. Manually inputted information, such as information relating to parking costs and identification as resident parking, information obtained from the Internet, for example that a carless Sunday has been declared in a city, and existing stationary information systems, such as publicly accessible information about the occupancy of parking garages, can be integrated into the global map of the cloud via corresponding interfaces. According to the present invention, the parking spaces are present at least partly as virtual parking spaces.

Via the communication interfaces of vehicles 3, 5 and of devices 15, 17, cloud computing system 1 can receive data from these and communicate data to these. For this purpose, cloud computing system 1 networks the vehicle with databases, and the communication can take place for example via a mobile network, an installed SIM card, or via a coupled mobile device such as a smartphone or a cell phone, for example via GSM, UMTS, or LTE.

The first vehicle 3 has an environmental acquisition device 11 that here includes, shown as examples, ultrasound sensors 7 situated at the front and at the rear, and a front camera 9 situated in the windscreen of vehicle 3.

Environmental acquisition device 11 can include ultrasound systems having groups of ultrasound sensors that together acquire a partial surrounding environment of the vehicle; for example, the ultrasound sensors in the front region for the acquisition of the front surrounding environment of the vehicle, and/or the ultrasound sensors in the side region for the acquisition of a side region of the vehicle, and/or the ultrasound sensors in the rear region of the vehicle for acquiring a rear surrounding environment of the vehicle can each be assigned to an ultrasound system. Here, four to six sensors can be installed in a bumper, such that only a maximum of four sensors are mounted with approximately the same direction of view. In particular to also acquire the region next to the motor vehicle, in the front bumper sensors are positioned whose region of acquisition is oriented to the left and to the right. In addition or alternatively, sensors can also be positioned in the rear bumper in such a way that they acquire a region to the left and to the right of the motor vehicle. In addition, the ultrasound system can also include a control device assigned to the respective group and a signal processing device.

Environmental acquisition device 11 can include further environmental sensors, such as a short-range radar system, an infrared system, PMD and/or a lidar system, but also a plurality of image sensors, in particular front cameras, rear cameras, BSD (blind spot detection) cameras, SVA (side view assistant) cameras, and/or SVS (surround view system) cameras, which can for example be used for other purposes by other driver assistance systems. The cameras can be monocular cameras or cameras of a stereo camera system.

Preferably, in optical systems a video sensor is situated in the front region, preferably in the center, a video sensor is situated in the rear region, also preferably in the center, and a respective video sensor is situated at each side of the motor vehicle. The video sensors in the front region and in the rear region can for example be positioned in the area of the windshield, for example in the mount of the interior rear-view mirror, and in the region of the rear windshield. Preferably, video sensors are additionally situated in the area of the bumpers. In this way, it is possible to acquire the entire environment around the motor vehicle. If optical sensors are used, image processing software is used in a conventional manner.

Environmental acquisition device 11 is part of a parking assistance system of first vehicle 3, which can also be referred to in the context of the present invention as a parking assistant, and which measures parking spaces while traveling past them and acquires their status. Environmental acquisition device 11 is set up to ascertain free parking spaces in the environment surrounding the vehicle.

In addition, first vehicle 3 has a navigation module 19 that constantly acquires the position of vehicle 3. Navigation module 19 can provide assistance to the parking assistance system, via an existing map, concerning known parking spaces and/or concerning obstacles that are to be ignored and/or openings such as entryways. As a result, the parking assistance system ascertains and communicates only free parking spaces, and not every open surface that is laterally present next to the vehicle.

Moreover, first vehicle 3 has a communication unit 13. Communication unit 13 is set up to transmit ascertained information about the free parking spaces to cloud computing system 1.

First vehicle 3 and second vehicle 5 have units 23 that are set up to call information about the free parking spaces from cloud computing system 1 and provide it to a traffic participant. The communication can take place for example over a mobile network, using an installed SIM card, or via a coupled mobile device such as a smartphone or cell phone. Communication unit 13 can for example control a display, in particular a head-up display, in the vehicle, or can issue a voice message. Second vehicle 5 is not equipped with an environmental acquisition device, and thus does not contribute to the global map in the cloud, but receives the information provided by cloud computing system 1 about parking spaces, in particular virtual ones.

Unit 13 of first vehicle 3 is connected to navigation module 19. Via navigation module 19 there takes place the presentation of the free parking spaces communicated by cloud 1, as well as preferably also the interaction with the driver of first vehicle 3 in order to choose a free parking space and to cause the vehicles to approach these parking spaces autonomously or semi-autonomously.

Mobile device 15 and tablet 17 represent examples of additional units that are set up to call information about the free parking spaces from the cloud system and provide it to a traffic participant. Via a suitable app, the local segments of the global map with the free parking spaces in cloud 1 are made accessible to the traffic participant.

Figure 2A:
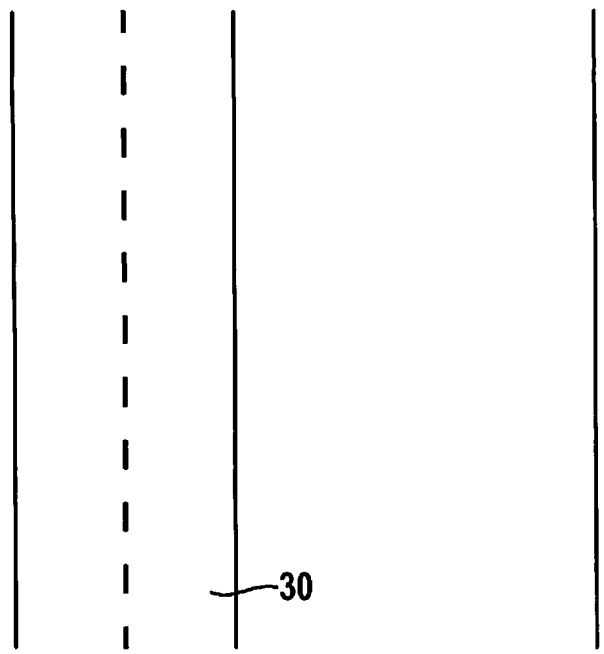
FIGS. 2A-D schematically show a sequence according to the present invention in the provision of a virtual parking space.
Figure 2B:
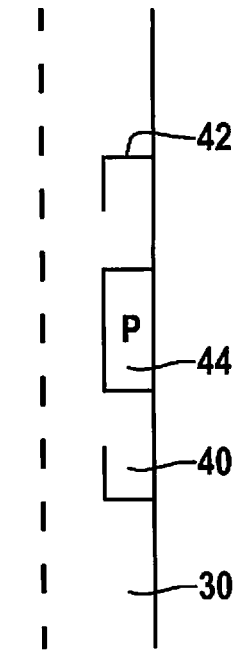

The method according to the present invention is further illustrated in FIG. 2:

FIG. 2A schematically shows a real view of a part of a street 30 in a bird's-eye view. At first, the driver of a vehicle 50 equipped with an assistance system fashioned according to the present invention cannot see that some regions of this stretch of roadway 30 are available as parking spaces, because no parking space markings are present, such as boundary lines on the roadway. However, based on the GPS position of vehicle 50, cloud computing system 1 knows that a particular surface 40 at the right side of the roadway, as shown in FIG. 2B, is available as a public parking space and is currently not occupied. Surface 40 is accordingly a virtual parking space.

The surface 40 available for parking is displayed to the driver according to the present invention. For this purpose, in this example, as indicated in FIG. 2B, virtual parking space markings 42 are produced and are displayed to the driver, for example on a head-up display. In addition, a parking space symbol 44 can be blended in. Optionally, additional information, such as the maximum parking duration, parking fees, or current distance information, can be provided by cloud computing system 1 and displayed to the driver.

Figure 2C:
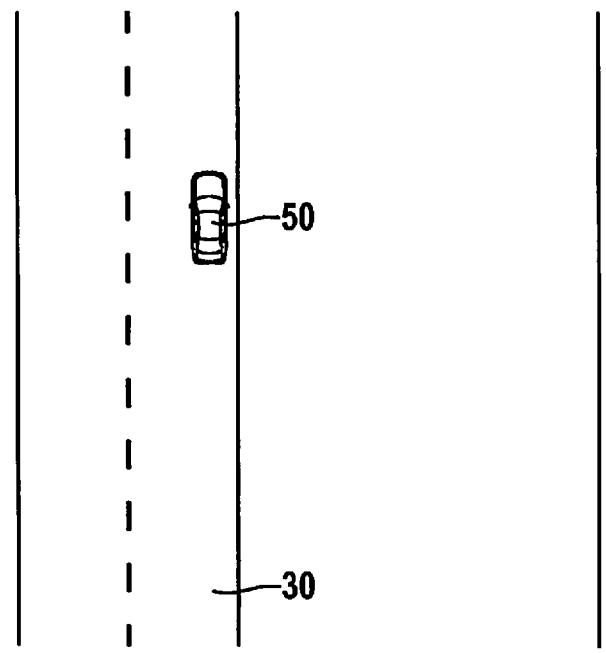
Figure 2D:
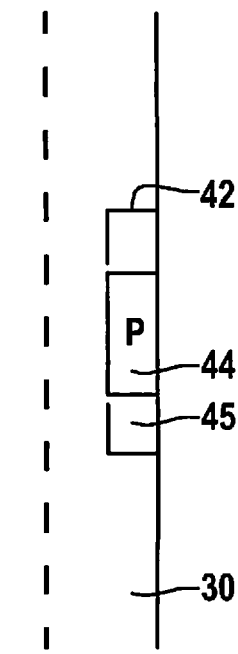

The driver now has all the information required to park vehicle 50 within surface 40, as shown in FIG. 2C. After termination of the parking process, the vehicle sends out its parking position and, if warranted, further information, such as the expected parking duration, to cloud computing system 1. From this information, the cloud computing system can generate an updated map that provides a free parking space 45 that is reduced according to the parking position and size of vehicle 50, as shown in FIG. 2D.

Figure 3A:
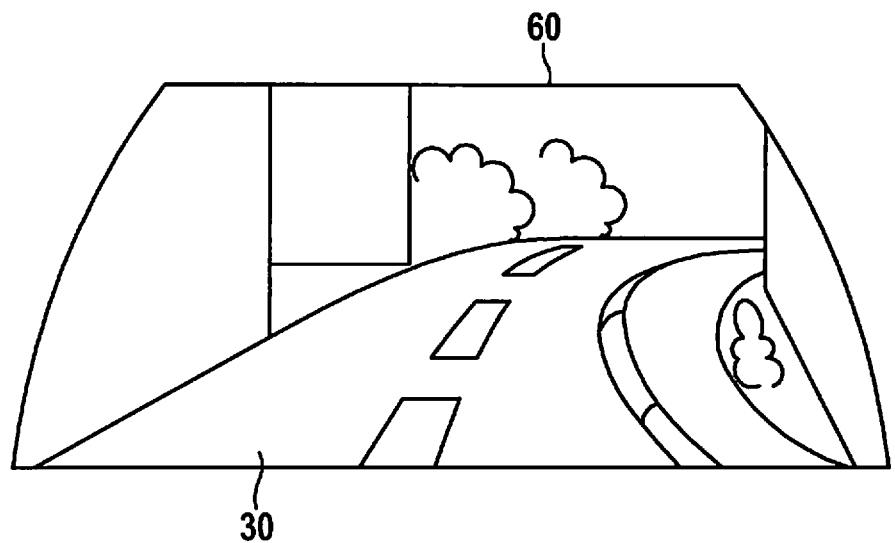
FIGS. 3A and 3B show the field of view of the driver without and with displayed information concerning a virtual parking space.

In FIG. 3, the situation described with reference to FIG. 2 is again shown schematically from the point of view of the driver. FIG. 3A shows the real view 60 of the driver towards street segment 30, which does not have drawn parking spaces.

Figure 3B:
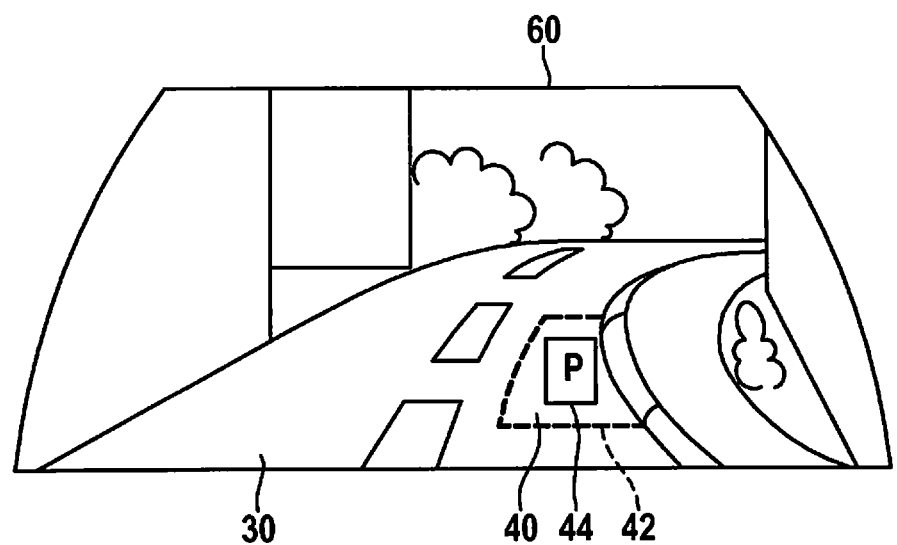

FIG. 3B shows the view with activated assistance system. Using a head-up display, the driver is shown the information obtained through the cloud computing system concerning available parking surface 40. Virtual boundary lines 42, as well as a parking space symbol 44, are produced and are displayed to the driver on the head-up display in such a way that, according to the principle of "augmented reality," the driver is given a realistic impression of a parking space boundary. This makes it easier for the driver to park correctly.

The present invention is not limited to the exemplary embodiments described here or to the aspects emphasized here. Rather, within the range indicated by the claims, a large number of modifications are possible that are within the competence of those skilled in the art.

What is claimed is:

1. A method for determining parking spaces, comprising:
   ascertaining, by traffic participants, information about free parking spaces;
   communicating the information to a cloud computing system, the cloud computing system storing information about the free parking spaces in retrievable fashion in a parking space map, the cloud computing system ascertaining and providing a free parking space in at least one of: i) a local surrounding environment of a traffic participant of the traffic participants, and ii) an environment of a known navigation destination; and
   visually presenting information about the provided parking space on a display device of the traffic participant;
   wherein the display device is a head-up display, the head-up display blending virtual objects into the field of view of a driver of the traffic participant;
   wherein the traffic participants are vehicles equipped with environmental acquisition devices that, when traveling past the free parking spaces, ascertain the free parking spaces, independently of whether parking space markings are present; and
   wherein the visually presenting step includes visually displaying on the head-up display virtual boundary lines for the provided parking space and a virtual parking space symbol between the virtual boundary lines, the virtual boundary lines being visibly separate from the virtual parking space symbol, the head-up display blending the virtual boundary lines and the virtual parking space symbol into the field of view of the driver;
   wherein the provided parking space is a free parking space without parking space markings.

2. The method as recited in claim 1, wherein at least one of locations, sizes, and further meta-information, about parking spaces is ascertained.

3. The method as recited in claim 1, wherein a location of the free parking space is ascertained via a navigation system.

4. The method as recited in claim 1, wherein the cloud computing system ascertains and provides the free parking space on the basis of at least one of: i) vehicle dimensions of the traffic participant, ii) preferences defined by the driver of the traffic participant, and iii) properties of the parking space.

5. The method as recited in claim 1, wherein, as a function of current conditions, the cloud computing system makes available or blocks specified surfaces as parking spaces.

6. A non-transitory computer-readable storage medium on which is stored a computer program for determining parking spaces, the computer program, when executed by a programmable device, causing the programmable device to perform:
- ascertaining, by traffic participants, information about free parking spaces;
- communicating the information to a cloud computing system, the cloud computing system storing information about the free parking spaces in retrievable fashion in a parking space map, the cloud computing system ascertaining and providing a free parking space in at least one of: i) a local surrounding environment of a traffic participant of the traffic participants, and ii) an environment of a known navigation destination; and
- visually presenting information about the provided parking space on a display device of the traffic participant;
- wherein the display device is a head-up display, the head-up display blending virtual objects into the field of view of a driver of the traffic participant;
- wherein the traffic participants are vehicles equipped with environmental acquisition devices that, when traveling past free parking spaces, ascertain the free parking spaces, independently of whether parking space markings are present; and
- wherein the visually presenting step includes visually displaying on the head-up display virtual boundary lines for the provided parking space and a virtual parking space symbol between the virtual boundary lines, the virtual boundary lines being visibly separate from the virtual parking symbol, the head-up display blending the virtual boundary lines and the virtual parking space symbol into the field of view of the driver;
- wherein the provided parking space is a free parking space without parking space markings.

7. A free parking space assistance system, comprising:
- at least one first vehicle having an environmental acquisition device and a communication unit, the environmental acquisition device being set up to ascertain free parking spaces in the surrounding environment of the first vehicle when traveling past the free parking spaces, and the communication unit being set up to transmit ascertained information about the free parking spaces, the ascertainment of the free parking spaces by the at least one first vehicle being independent of whether parking space markings are present;
- a cloud computing system that is set up to receive information about the free parking spaces from the at least one first vehicle and to store the information in a parking space map, the cloud computing system further set up to provide the information about the free parking spaces on request, the cloud computing system designed to ascertain and provide a free parking space in at least one of: a local environment of a traffic participant, and an environment of a known navigation destination; and
- at least one second vehicle having a display device, the display device visually presenting information about the provided parking space;
- wherein the display device is a head-up display, the head-up display blending virtual objects into the field of view of a driver of the second vehicle; and
- wherein the head-up display visually displays virtual boundary lines for the provided parking space and a virtual parking space symbol between the virtual boundary lines, the virtual boundary lines being visibly separate from the virtual parking space symbol, the head-up display blending the virtual boundary lines and the virtual parking space symbol into the field of view of the driver;
- wherein the provided parking space is a free parking space without parking space markings.

8. The free parking space assistance system as recited in claim 7, wherein the environmental acquisition device of the at least one first vehicle includes a camera, the environmental acquisition device ascertaining meta-information about the free parking spaces from road signs using the camera and image processing, the communication unit transmitting the meta-information about the free-information to the cloud computing system, wherein the cloud computing system receives the meta-information about the free parking spaces, and the cloud computing system is designed to ascertain and provide the free parking space to the second vehicle taking into consideration the meta-information about the free parking spaces.

9. The free parking space assistance system as recited in claim 8, wherein the road signs includes at least one of: (i) a "no stopping" sign, (ii) a sign identifying a parking space designated as a resident parking space, (iii) a sign identifying a parking space designated for the handicapped, (iv) a sign identifying a parking space designated as a family parking space, (v) a sign identifying a parking space designated as a women's parking space, and (vi) a sign identifying a parking space designated as a private parking space.

* * * * *